United States Patent
Saitou et al.

(10) Patent No.: US 6,587,627 B2
(45) Date of Patent: Jul. 1, 2003

(54) DISPERSION-COMPENSATING FIBER, AND DISPERSION-COMPENSATING MODULE AND HYBRID OPTICAL FIBER LINK USING THE SAME

(75) Inventors: Manabu Saitou, Sakura (JP); Shoichiro Matsuo, Sakura (JP)

(73) Assignee: Fujikura Ltd., Tokyo (JP)

(*) Notice: Subject to any disclaimer, the term of this patent is extended or adjusted under 35 U.S.C. 154(b) by 0 days.

(21) Appl. No.: 10/097,693

(22) Filed: Mar. 12, 2002

(65) Prior Publication Data

US 2002/0164138 A1 Nov. 7, 2002

(30) Foreign Application Priority Data

Mar. 15, 2001 (JP) ........................................ 2001-074523

(51) Int. Cl.[7] ................................................. G02B 6/02
(52) U.S. Cl. ........................ 385/127; 385/123; 385/124; 385/125; 385/126
(58) Field of Search .............................. 385/123, 124, 385/125, 126, 127, 128

(56) References Cited

U.S. PATENT DOCUMENTS

| | | | | |
|---|---|---|---|---|
| 5,673,354 A | * | 9/1997 | Akasaka et al. | 385/127 |
| 5,721,800 A | * | 2/1998 | Kato et al. | 385/127 |
| 5,732,178 A | * | 3/1998 | Terasawa et al. | 385/127 |
| 5,838,867 A | | 11/1998 | Onishi et al. | |
| 5,852,701 A | * | 12/1998 | Kato et al. | 385/127 |
| 5,999,679 A | | 12/1999 | Antos et al. | |
| 6,009,221 A | | 12/1999 | Tsuda | |
| 6,011,892 A | | 1/2000 | Chraplyvy et al. | |
| 6,072,929 A | * | 6/2000 | Kato et al. | 385/123 |
| 6,181,858 B1 | * | 1/2001 | Kato et al. | 385/123 |
| 6,263,138 B1 | | 7/2001 | Sillard et al. | |
| 6,275,638 B1 | * | 8/2001 | Sasaoka et al. | 385/127 |
| 6,335,995 B1 | * | 1/2002 | Kato et al. | 385/123 |
| 6,363,196 B1 | * | 3/2002 | Rousseau et al. | 385/127 |
| 6,483,975 B1 | * | 11/2002 | Hsu et al. | 385/123 |

FOREIGN PATENT DOCUMENTS

| | | |
|---|---|---|
| JP | 10-319266 | 12/1998 |
| JP | 10-325913 | 12/1998 |
| JP | 2000-47048 | 2/2000 |

OTHER PUBLICATIONS

Grüner–Nielsen, L., et al., "New dispersion compensating fibres for simultaneous compensation of dispersion and dispersion slope of non–zero dispersion shifted fibres in the C or L band," Optical Fiber Communication Conference 2000, Baltimore Convention Center, Baltimore, Maryland, Mar. 7–10, 2000, pp. 101–103.

(List continued on next page.)

Primary Examiner—Akm E. Ullah
Assistant Examiner—Jennifer Doan
(74) Attorney, Agent, or Firm—Bell, Boyd & Lloyd LLC

(57) ABSTRACT

A dispersion-compensating fiber is provided that can compensate chromatic dispersion of a DSF in the L-band (wavelength of 1.565 $\mu$m to 1.625 $\mu$m). The dispersion-compensating fiber is provided with a central core segment, an intermediate core segment, a ring core segment, and a clad, which are provided in this sequence concentrically from the inside, and has refractive index profile such that the refractive indices of these segments satisfy the relationship of intermediate core segment<clad$\leq$ring core segment<central core segment. When a dispersion-shifted fiber having a zero dispersion wavelength of 1.55 $\mu$m±0.05 $\mu$m has been compensating, the residual chromatic dispersion in all or part of the L-band is within ±1.5 ps/nm/km.

11 Claims, 6 Drawing Sheets

OTHER PUBLICATIONS

Fujii, T., et al., "High Performance Dispersion Compensating Fiber Modules By 'Stress–Free Coil' Packaging Technique," National Fiber Optic Engineers Conference, Colorado Convention Center, Denver, Colorado, Aug. 27–31, 2000, pp. 420–429.

Gnauck, A., et al., "Dispersion and Dispersion–Slope Compensation of NZDSF for 40–Gb/s Operation over the Entire C Band," Optical Fiber Communication Conference 2000, Post Deadline Paper, Baltimore Convention Center, Baltimore, Maryland, Mar. 7–10, 2000, 4 pages.

Ryuichi Sugizaki, "Dispersion slope compensating fibers for L–band WDM systems using NZ–DSF," Optical Fiber Communication Conference 2000, Baltimore Convention Center, Baltimore, Maryland, Mar. 7–10, 2000, pp. 95–97.

Yanada, E., et al., "Dual–band Hybrid Transmission Line Consisting of Pure Silica Core Fiber and Dispersion Compensating Fiber," Optical Fiber Communication Conference 2000, Baltimore Convention Center, Baltimore, Maryland, Mar. 7–10, 2000, pp. 92–94.

Knudsen, S., et al., "Large effective area dispersion compensating fiber for cabled compensation of standard single mode fiber," Optical Fiber Communication Conference 2000, Baltimore Convention Center, Baltimore, Maryland, Mar. 7–10, 2000, pp. 98–100.

* cited by examiner

FIG. 4

| c [μm] | Δ1 [%] | Δ2 [%] | Δ3 [%] | b/a | c/a |
|---|---|---|---|---|---|
| 7.83 | 1.2 | -0.9 | 0.55 | 3.0 | 4.0 |
| TRANSMISSION LOSS [dB/km] (1600nm) | CHROMATIC DISPERSION [ps/nm/km] (1600nm) | DISPERSION SLOPE [ps/nm²/km] (1600nm) | $2m\lambda c$ [μm] | Aeff [μm²] (1600nm) | BENDING LOSS [dB/m] (1600nm) |
| 0.497 | -19.863 | -0.283 | 1.52 | 15.93 | 3.1 |

FIG. 5

| TRANSMISSION LOSS [dB/km] (1550nm) | CHROMATIC DISPERSION [ps/nm/km] (1550nm) | DISPERSION SLOPE [ps/nm²/km] (1550nm) | $2m\lambda c$ [μm] | Aeff [μm²] (1550nm) | BENDING LOSS [dB/m] (1550nm) |
|---|---|---|---|---|---|
| 0.198 | -0.038 | 0.0672 | 0.962 | 48.6 | 9.4 |

FIG. 6

| | c [$\mu$m] | $\Delta$1 [%] | $\Delta$2 [%] | $\Delta$3 [%] | b/a | c/a |
|---|---|---|---|---|---|---|
| 1 | 8.45 | 1.0 | -1.3 | 0.20 | 2.0 | 3.6 |
| 2 | 8.16 | 2.0 | -1.4 | 0.25 | 2.8 | 5.8 |
| 3 | 13.47 | 1.0 | -1.4 | 0.05 | 1.8 | 5.8 |
| 4 | 5.70 | 1.1 | -1.5 | 0.35 | 2.0 | 2.6 |
| 5 | 7.42 | 1.0 | -1.4 | 0.30 | 1.8 | 3.0 |
| 6 | 7.96 | 1.1 | -1.5 | 0.35 | 2.2 | 3.6 |
| 7 | 9.49 | 1.2 | -1.4 | 0.20 | 2.2 | 4.6 |
| 8 | 8.26 | 1.8 | -1.4 | 0.25 | 2.8 | 5.4 |

FIG. 7

| | TRANSMISSION LOSS [dB/km] (1600nm) | CHROMATIC DISPERSION [ps/nm/km] (1600nm) | DISPERSION SLOPE [ps/nm²/km] (1600nm) | 2mλc [μm] (1600nm) | Aeff [μm²] (1600nm) | BENDING LOSS [dB/m] (1600nm) | LENGTH OF DISPERSION-COMPENSATING FIBER [km] | RESIDUAL DISPERSION OF L-BAND [ps/nm/km] |
|---|---|---|---|---|---|---|---|---|
| 1 | 0.398 | −10.000 | −0.206 | 1.21 | 18.64 | 3.7 | 44 | 0.15 |
| 2 | 1.642 | −187.820 | −3.311 | 1.52 | 10.44 | 10.1 | 2 | 0.53 |
| 3 | 0.402 | −13.135 | −0.206 | 1.35 | 18.45 | 9.7 | 32 | 0.45 |
| 4 | 0.421 | −11.512 | −0.185 | 1.18 | 16.31 | 4.5 | 37 | 0.41 |
| 5 | 0.411 | −8.156 | −0.137 | 1.30 | 19.96 | 0.2 | 53 | 0.31 |
| 6 | 0.552 | −22.846 | −0.500 | 1.51 | 16.61 | 6.9 | 19 | 0.21 |
| 7 | 0.702 | −31.350 | −0.568 | 1.52 | 15.40 | 6.0 | 13 | 0.38 |
| 8 | 1.203 | −88.169 | −1.409 | 1.46 | 10.54 | 3.9 | 5 | 0.57 |

DISPERSION-COMPENSATING FIBER, AND DISPERSION-COMPENSATING MODULE AND HYBRID OPTICAL FIBER LINK USING THE SAME

BACKGROUND OF THE INVENTION

1. Field of the Invention

The present invention relates to a dispersion-compensating fiber, and a dispersion-compensating module and a hybrid optical fiber link using the same.

2. Description of the Related Art

Systems such as a long-distance nonreproducing relay system using an optical amplifier, such as an erbium-doped optical fiber amplifier, in a waveband of 1.53 μm to 1.63 μm are currently available on the commercial market. With the dramatic increase in communication capacity, the development of wavelength division multiplexing (WDM) transmission is proceeding rapidly.

In the attempt to achieve higher transmission speeds in this type of large-capacity WDM transmission, waveform deterioration caused by accumulated dispersion of the optical fiber (for sake of convenience, hereinafter termed "optical fiber for transmission"), which the optical signal is transmitted on, becomes problematic. Accordingly, there has been proposed a dispersion management system using a hybrid optical fiber link which compensates positive accumulated dispersion, accumulated by transmission along the optical fiber for transmission, by using a dispersion-compensating fiber having negative chromatic dispersion with a comparatively large absolute value in a 1.55 μm band. Accumulated dispersion is chromatic dispersion which accumulates when an optical signal is transmitted on an optical fiber.

Recently, there have been proposals for a chromatic dispersion slope-compensating type dispersion-compensating fiber, which can compensate chromatic dispersion and chromatic dispersion slope so as to improve the transmission characteristics in WDM transmission. For instance, Japanese Unexamined Patent Application, First Publication No. Hei 10-325913 and the like disclose a dispersion-compensating fiber which compensates accumulated dispersion in a case where the optical fiber for transmission comprises a single-mode optical fiber having zero dispersion in a band of 1.3 μm (hereinafter abbreviated as SMF for 1.3 μm), and Japanese Unexamined Patent Application, First Publication No. 2000-47048 and the like disclose a dispersion-compensating fiber which compensates accumulated dispersion in a case where the optical fiber for transmission comprises a non-zero dispersion-shifted fiber (NZ-DSF). The NZ-DSF has chromatic dispersion with a comparatively small absolute value in a band of 1.55 μm, but the zero dispersion wavelength is deviated from 1.55 μm in order to prevent four-wave mixing, which is one type of nonlinear effect.

An optical fiber having a zero dispersion wavelength close to 1.55 μm, where quartz loss is at its minimum, is termed a dispersion-shifted fiber (hereinafter "DSF") and is in practical use.

When there is zero dispersion wavelength close to 1.55 μm as described above, four-wave mixing occurs and the transmission characteristics deteriorate. For this reason, the DSF has been deemed unsuitable for WDM transmissions close to the C-band (wavelength of 1.53 μm to 1.565 μm), which is widely used in conventional WDM transmission.

However, in view of the recent increase in communication capacity, the waveband used in such transmissions has been increased to what is termed an L-band (wavelength of 1.565 μm to 1.625 μm).

Since the DSF does not have a zero dispersion wavelength in the L-band, it is suitable for WDM transmission in the L-band, and, in combination with a dispersion-compensating fiber, it is possible to provide a large-capacity and high-speed hybrid optical fiber link which has excellent transmission characteristics. This has a considerable advantage that existing DSF can be used.

SUMMARY OF THE INVENTION

Accordingly, the present inventors considered how to provide a dispersion-compensating fiber which can compensate the chromatic dispersion of a DSF in the L-band, and, as a result of varied investigations, succeeded in perfecting the present invention.

The present inventors considered the characteristics appropriate to a dispersion-compensating fiber, as yet undeveloped, which would be capable of compensating accumulated dispersion of a DSF in the L-band, and a variety of design conditions, such as the refractive index profile, which are necessary to achieve those characteristics, and perfected the invention described below.

In order to achieve the above objects, the dispersion-compensating fiber according to the present invention comprises a central core segment; an intermediate core segment which is provided around the central core segment; a ring core segment which is provided around the intermediate core segment; and a clad which is provided around the ring core segment, wherein the refractive index profile of the dispersion-compensating fiber being such that the intermediate core segment has a lower refractive index than the central core segment, the ring core segment has a refractive index which is higher than that of the intermediate core segment and lower than that of the central core segment, and the clad has a refractive index which is lower than or equal to that of the ring core segment and higher than that of the intermediate core segment; and when the dispersion-compensating fiber is linked with a dispersion-shifted fiber which satisfies the following conditions: (A) single-mode transmission is actually achieved at a wavelength of 1.565 μm (B) the zero dispersion wavelength is within the range of 1.55 μm±0.05 μm (C) at all wavelengths of between 1.525 μm and 1.575 μm, chromatic dispersion is greater than or equal to −3.5 ps/nm/km and less than or equal to +3.5 ps/nm/km (D) the dispersion slope at the zero chromatic dispersion is greater than or equal to +0.05 ps/nm$^2$/km and less than or equal to +0.085 ps/nm$^2$/km, the residual chromatic dispersion is below +1.5 ps/nm/km in all or part of the band of wavelengths from 1.565 μm to 1.625 μm.

A dispersion-compensating module according to the present invention uses the dispersion-compensating fiber described above.

A hybrid optical fiber link according to the present invention comprises the dispersion-compensating fiber described above; and a dispersion-shifted fiber which is linked with the dispersion-compensating fiber and which satisfies the following conditions (E) single-mode transmission is actually achieved at a wavelength of 1.565 μm (F) the zero dispersion wavelength is within the range of 1.55 μm±0.05 μm (G) at all wavelengths of between 1.525 μm and 1.575 μm, chromatic dispersion is greater than or equal to −3.5 ps/nm/km and less than or equal to +3.5 ps/nm/km (H) the dispersion slope at the zero dispersion wavelength is greater than or equal to +0.05 ps/nm²/km and less than or equal to 0.085 ps/nm²/km.

Although different symbols (A) to (D) and (E) to (H) are used above, they represent identical contents, (A) to (D) corresponding to (E) to (H).

According to the present invention, chromatic dispersion of the DSF can be compensated in the L-band. Therefore, the hybrid optical fiber link can be provided which is suitable for WDM transmission and long-distance transmission using an existing DSF.

BRIEF DESCRIPTION OF THE DRAWINGS

FIG. 4 is a diagram showing the optical characteristics of the dispersion-compensating fiber.

FIG. 5 is a diagram showing the measurements for all the optical characteristics other than the cut-off wavelength obtained at a wavelength of 1550 nm.

FIG. 6 is a diagram showing characteristics of a dispersion-compensating fiber, manufactured by the same method as in the experimental example.

FIG. 7 is a diagram showing chromatic dispersion per one km when the dispersion-compensating fiber is connected to the DSF.

DETAILED DESCRIPTION OF THE PREFERRED EMBODIMENTS

Figure 1:
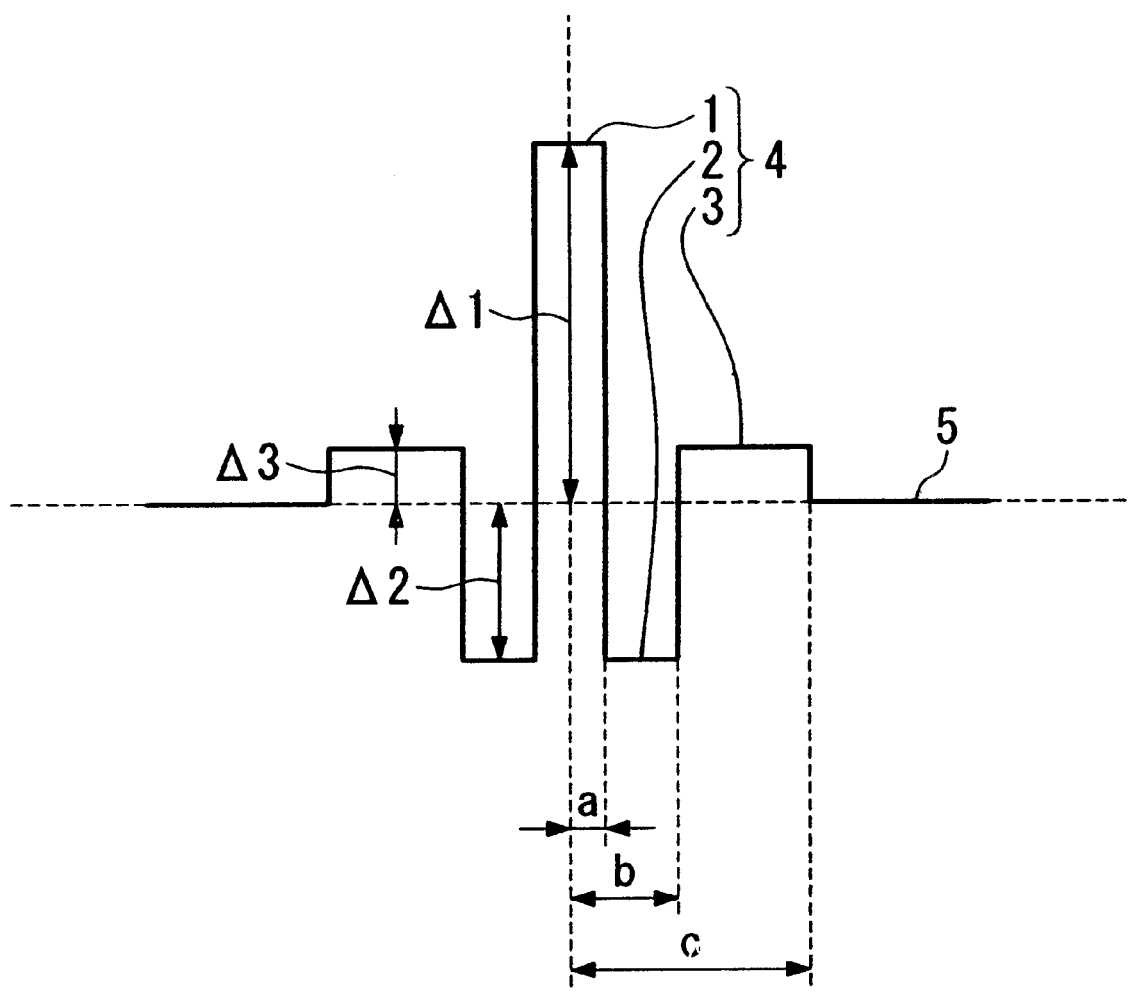
FIG. 1 is a diagram showing one example of the refractive index profile of a dispersion-compensating fiber according to an embodiment of the present invention.

FIG. 1 shows one example of the refractive index profile of the dispersion-compensating fiber according to an embodiment of the present invention.

The dispersion-compensating fiber comprises a core 4, and a clad 5 which is provided around the core 4. The core 4 comprises a centrally-provided central core segment 1, an intermediate core segment 2, and a ring core segment 3. The intermediate core segment 2 and the ring core segment 3 are provided sequentially and concentrically around the central core segment 1. That is, the dispersion-compensating fiber has a four-region structure.

The intermediate core segment 2 has a low refractive index than the central core segment 1, and the ring core segment 3 has a refractive index which is higher than that of the intermediate core segment 2 but lower than that of the central core segment 1. The clad 5 has a refractive index which is lower than that of the ring core segment 3, but higher than that of the intermediate core segment 2.

The ring core segment 3 should preferably have a refractive index which is higher than that of the clad 5; however, depending on the characteristics which are required of the transmission system, the ring core segment 3 may have the same refractive index as the clad 5, resulting in refractive index profile having a three-region structure.

In many cases, the actual shape of the refractive index profile does not have clear boundaries between the regions as depicted in FIG. 1, and the actual curve is more gentle, but the refractive index profile need only be practically similar to that of FIG. 1.

The dispersion-compensating fiber is comprised of quartz-type glass, and in this example, the central core segment 1 and the ring core segment 3 comprise germanium-doped quartz glass, the intermediate core segment 2 comprises pure quartz glass or fluorine-doped quartz glass, and the clad 5 comprises pure quartz glass or fluorine-doped quartz glass. The dispersion-compensating fiber can be manufactured by using a conventional method of drawing a fiber base material, obtained by a well-known method such as VAD, MCVD, or PCVD.

In FIG. 1, reference symbols Δ1, Δ2, and Δ3 respectively represent the relative refractive index differences of the central core segment 1, the intermediate core segment 2, and the ring core segment 3, with respect to the clad 5 (i.e. when the clad 5 is used as a reference {zero}). When the refractive indices of the central core segment 1, the intermediate core segment 2, the ring core segment 3, and the clad 5 are $n_1$, $n_2$, $n_3$, and $n_{clad}$, respectively, Δ1, Δ2, and Δ3 are defined as follows.

$$\Delta 1 = (n_1^2 - n_{clad}^2)/2n_1 \approx (n_1 - n_{clad})/n_1 \approx (n_1 - n_{clad})/n_{clad}$$

$$\Delta 2 = (n_2^2 - n_{clad}^2)/2n_2 \approx (n_2 - n_{clad})/n_1 \approx (n_2 - n_{clad})/n_{clad}$$

$$\Delta 3 = (n_3^2 - n_{clad}^2)/2n_3 \approx (n_3 - n_{clad})/n_1 \approx (n_3 - n_{clad})/n_{clad}$$

Furthermore, in FIG. 1, reference symbols "a" and "b" represent the radii of the central core segment 1 and the intermediate core segment 2 respectively. Reference symbol "c" represents the radius of the ring core segment 3, i.e. the radius of the core 4.

By appropriately setting the structural parameters of the abovementioned dispersion-compensating fiber, such as, mainly, Δ1, Δ2, Δ3, c, b/a, and c/a, it is possible to provide a dispersion-compensating fiber having characteristics such that it can compensate accumulated dispersion of a DSF in all or part of the L-band.

The greater the absolute value of chromatic dispersion of the dispersion-compensating fiber, the shorter the length of the dispersion-compensating fiber (with respect to the length of the DSF) which can compensate the accumulated dispersion of the DSF. This is desirable with regard to cost and transmission loss.

The dispersion-compensating fiber according to the embodiment of the present invention should preferably have a negative dispersion slope, enabling it to compensate the positive dispersion slope of the DSF. By compensating the dispersion slope, it is possible to provide a hybrid optical fiber link suitable for WDM transmission.

When the difference between the effective area of the dispersion-compensating fiber and the effective area of the DSF becomes too great, splice loss increases. For this reason, the effective area of the dispersion-compensating fiber should preferably be a suitable size.

Specifically, at a wavelength of 1.60 μm, the dispersion-compensating fiber according to the embodiment of the present invention should preferably have chromatic dispersion of less than or equal to −8 ps/nm/km, a dispersion slope of less than or equal to −0.12 ps/nm²/km, an effective area of more than or equal to 10 μm², and a bending loss of less than or equal to 70 dB/m.

More preferably, the dispersion-compensating fiber should have chromatic dispersion of less than or equal to −18 ps/nm/km, a dispersion slope of less than or equal to −0.30 ps/nm²/km, an effective area of more than or equal to 12 μm², and a bending loss of less than or equal to 40 dB/m.

Although there are no particular restrictions on the minimum values of the chromatic dispersion and dispersion slope, they can practically be set greater than or equal to −150 ps/nm²/km and −3.0 ps/nm²/km respectively.

Although there is no particular restriction on the maximum value of the effective area, a dispersion-compensating fiber having an effective area of below or equal to 22 μm² can practically be manufactured. An effective area Aeff is defined by the following equation.

$$Aeff = \frac{2\pi \left\{ \int_0^\infty r|E(r)|^2 dr \right\}^2}{\int_0^\infty r|E(r)|^4 dr}$$

Here, r represents the core radius, and E(r) represents the electromagnetic intensity of the radius "r".

Although there are no particular restrictions on the effective area of the DSF being-compensating, at a wavelength of 1.60 μm, the effective area should be greater than 45 μm², preferably greater than 50 μm², and practically less than approximately 60 μm².

The condition for the bending loss is that, at a wavelength of 1.60 μm, the bend diameter should be 20 mm. The dispersion-compensating fiber according to the embodiment of the present invention has a usable waveband of 1.565 μm to 1.625 μm, which is on the long wave side. The bending loss tends to be greater when the usable waveband is farther to the long wave side, but in the dispersion-compensating fiber according to the embodiment of the present invention having the refractive index profile mentioned above, the bending loss can be set at less than or equal to 70 dB/m, and more preferably less than or equal to 40 dB/m, at a wavelength of 1.60 μm, by appropriately selecting and designing the structural parameters.

When there is considerable bending loss, transmission characteristics deteriorate as a result of bends applied at the time of manufacture, installation, or inside the module, and the like.

The dispersion-compensating fiber according to the embodiment of the present invention is a single-mode optical fiber, and therefore must have a cut-off wavelength which can be transmitted in single-mode in the waveband being used. A value obtained by using the method stipulated in ITU-T standard G.650, is generally used as the cut-off wavelength; but even when the actual length of the cut-off wavelength obtained by the ITU-T method is greater than 1.565 μm, which is the minimum used waveband of the dispersion-compensating fiber according to the embodiment of the present invention, it can still be transmitted in single-mode. Therefore, there are no restrictions on the cut-off wavelength, which need only be suitable for the conditions of usage, such as the length which is used.

To ensure that the dispersion-compensating fiber has these desirable characteristics, the Δ1, Δ2, Δ3, and c, shown in FIG. 1, should preferably satisfy the following conditions of (1) to (4) respectively.

(1) Δ1: greater than or equal to 0.8% and less than or equal to 2.4%
(2) Δ2: greater than or equal to −2.0% and less than or equal to −0.5%
(3) Δ3: greater than 0% and less than or equal to 0.7%
(4) c: greater than or equal to 5 μm and less than or equal to 17 μm In (1), when Δ1 is less than 0.8%, the absolute value of the chromatic dispersion becomes very small, increasing the used length (necessary length) of the dispersion-compensating fiber; when Δ1 exceeds 2.4%, the effective area is likely to decrease and transmission loss is more likely to increase.

In (2), when Δ2 exceeds −0.5%, the dispersion-compensating fiber cannot sufficiently compensate the dispersion slope of the DSF; and when Δ2 falls below −2.0%, there is a danger that the transmission loss will greatly increase.

In (3), when Δ3 exceeds 0.7%, the cut-off wavelength becomes longer, making it impossible to guarantee single-mode transmission; when Δ3 is less than or equal to 0%, the effective area is very small, and the transmission characteristics deteriorate as a consequence. In order to achieve the desired effects with Δ3 of greater than or equal to 0%, Δ3 must actually be greater than or equal to 0.05%.

In (4), when c is less than 5 μm, bending loss increases, and the effects of microbends and the like are likely to further increase the loss; when c exceeds 17 μm, the cut-off wavelength becomes very long, making it impossible to guarantee single-mode transmission.

Furthermore, b/a should preferably be between 1.5 and 3.5. When b/a is below this minimum value, the effects of microbends and the like are likely to increase the loss, and b/a is above this maximum value, the Aeff tends to decrease.

There are no particular restrictions on the outer diameter of the clad 5, which is generally approximately 125 μm.

The preferable chromatic dispersion characteristics and dispersion slope characteristics of the dispersion-compensating fiber described above, and the preferable chromatic dispersion characteristics of a hybrid optical fiber link which uses the dispersion-compensating fiber, cannot always be obtained by arbitrarily selecting values from the numerical range defined in (1) to (4) above and using them during design, but are obtained by an appropriate combination of the structural parameters mentioned above. Therefore, since the embodiment of the present invention cannot be specified by its refractive index profile and structural parameters, it is here specified by its refractive index profile and characteristic values. It goes without saying that a dispersion-compensating fiber with these characteristics has not hitherto been realized. The dispersion-compensating fiber according to the embodiment of the present invention can be obtained once a person skilled in the art has performed trial-and-error tests of combinations of numerical values, selected from (1) to (4) above.

The DSF which is compensated by the dispersion-compensating fiber according to the embodiment of the present invention is generally defined by G.653 of the ITU-T, and satisfies the following conditions of (A) to (D).
(A) Single-mode transmission is actually achieved at a wavelength of 1.565 μm. (B) The zero dispersion wavelength is within the range of 1.55 μm±0.05 μm. (C) At all wavelengths of between 1.525 μm and 1.575 μm, chromatic dispersion is greater than or equal to −3.5 ps/nm/km and less than or equal to +3.5 ps/nm/km. (D) The dispersion slope at the above zero dispersion wavelength is greater than or equal to +0.05 ps/nm²/km and less than or equal to 0.085 ps/nm²/km.

Regarding the cut-off wavelength, it is possible to achieve single-mode transmission in the L-Band so long as the condition (A) is satisfied.

The DSF is comprised of a quartz-type glass, and, provided that its characteristics satisfy (A) to (D) above, there are no other conditions, such as relating to its refractive index profile. For instance, a DSF having step-like refractive index profile is acceptable. In step-like refractive index profile, the core comprises a central core segment and a step core segment, provided around the central core segment, and a clad is provided around the step core segment. Of these, the central core segment has the highest refractive index, followed by the step core segment, and lastly the clad. The central core segment and the step core segment comprise germanium-doped quartz glass or the like, and the clad comprises pure quartz glass or the like, for example.

The dispersion-compensating fiber according to the embodiment of the present invention compensates the accumulated dispersion of this type of DSF in all or part of a range of wavelengths from 1.565 µm to 1.625 µm, and can be used to construct a hybrid optical fiber link with low residual chromatic dispersion.

In constructing the hybrid optical fiber link using the dispersion-compensating fiber and the DSF, the lengths used are determined by the chromatic dispersion of the dispersion-compensating fiber and the DSF. For example, the value obtained by multiplying the used length of the DSF by the chromatic dispersion per unit length of the DSF is the overall chromatic dispersion of the DSF. By using a dispersion-compensating fiber having a length which is obtained when this value is divided by the absolute value of the residual chromatic dispersion per unit length of the dispersion-compensating fiber, the residual chromatic dispersion of the hybrid optical fiber link can logically be made zero.

Ordinarily, the length of the dispersion-compensating fiber should be less than or equal to one-half of the length of the DSF, and preferably between one-third to one-twentieth. When the dispersion-compensating fiber is too long, its transmission characteristics deteriorate and the cost increases.

Even with a comparatively short dispersion-compensating fiber, when the dispersion-compensating fiber according to the embodiment of the present invention is linked with a DSF which satisfies the conditions of (A) to (D) mentioned above to form a hybrid optical fiber link, the residual chromatic dispersion of the hybrid optical fiber link can be kept below ±1.5 ps/nm/km, and preferably below ±0.8 ps/nm/km in all or part of the band of wavelengths from 1.565 µm to 1.625 µm.

Furthermore, the dispersion-compensating fiber according to the embodiment of the present invention can be used as a module in the hybrid optical fiber link. By using the dispersion-compensating fiber as a module, space efficiency can be increased.

There are no particular restrictions on the configuration of the module. In one example, the dispersion-compensating fiber is wound around the side face of a cylindrical body comprising ceramic, metal, or the like, and accommodated in a rectangular case comprising the same material as the cylindrical body. The hybrid optical fiber link can, for instance, be constructed by connecting lead fibers to both ends of the wound dispersion-compensating fiber of the module, extracting the lead fibers through two holes, which are provided in the walls of the case, inserting the lead fibers midway on the DSF, and connecting them thereto.

Figure 3:
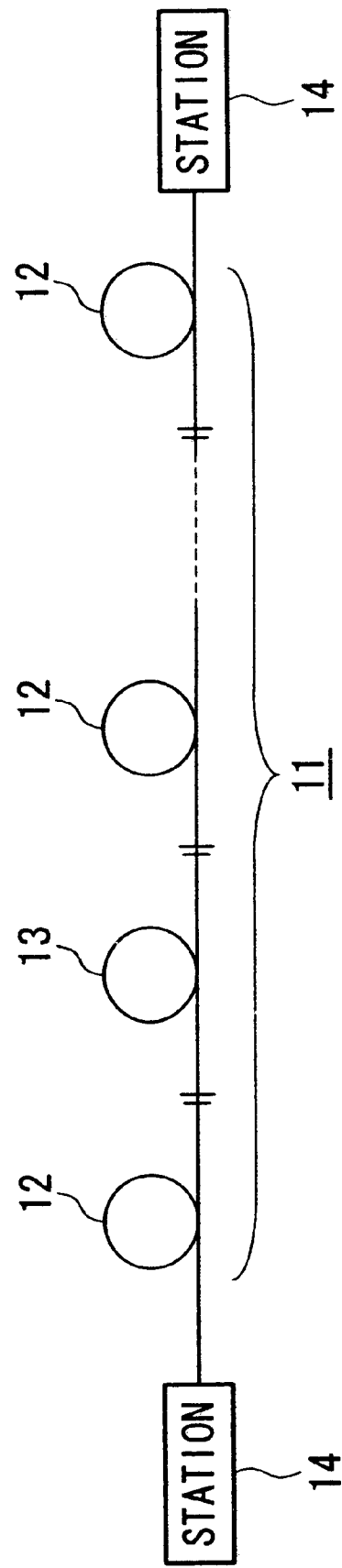
FIG. 3 is a block diagram showing the schematic constitution of a hybrid optical fiber link.

FIG. 3 shows the schematic constitution of a hybrid optical fiber link 11; reference numeral 12 represents a DSF, 13 represents a dispersion-compensating fiber module, and 14 represents a station.

EXPERIMENTAL EXAMPLES

Subsequently, the embodiment of the present invention will be explained in greater detail, but the values for the structural parameters and the like are not, of course, restricted to those used in these examples.

A dispersion-compensating fiber having the structural parameters shown in FIG. 4 was manufactured; FIG. 4 also shows the optical characteristics of the dispersion-compensating fiber. The outer diameter of the clad was approximately 125 µm.

In FIG. 4, "2 mλc" represents a measurement of the cut-off wavelength in the reference length of 2 m obtained by the method specified in ITU-T standard G.650. The measurements for transmission loss, chromatic dispersion, dispersion slope, Aeff (effective area), and bending loss, were all taken at a wavelength of 1600 nm.

A DSF with step-like refractive index profile, and having the optical characteristics shown in FIG. 5, was manufactured. In FIG. 5, the measurements for all the optical characteristics other than the cut-off wavelength were obtained at a wavelength of 1550 nm.

The radii of the central core segment and step core segment of this DSF were respectively 2.1 µm and 9.8 µm. The outer diameter of the clad was approximately 125 µm. The relative refractive index differences of the central core segment and the step core segment with respect to the clad were respectively 0.65% and 0.05%.

Then, a hybrid optical fiber link was constructed by linking 20 km of the dispersion-compensating fiber with 132 km of the above DSF. The lengths of these optical fibers were set to achieve minimum residual chromatic dispersion of the overall hybrid optical fiber link in a waveband of 1.565 µm to 1.625 µm.

FIGS. 6 and 7 show characteristics of a dispersion-compensating fiber, manufactured by the same method as in the above example, and chromatic dispersion per one km when the dispersion-compensating fiber is connected to the DSF. The length of the DSF is 132 km, the same as in the above example. As shown in FIGS. 6 and 7, by setting the refractive index profile appropriately, it becomes possible to increase the effective area Aeff, reduce residual chromatic dispersion, shorten the length of the dispersion-compensating fiber, and achieve other such design improvements.

Figure 2A:
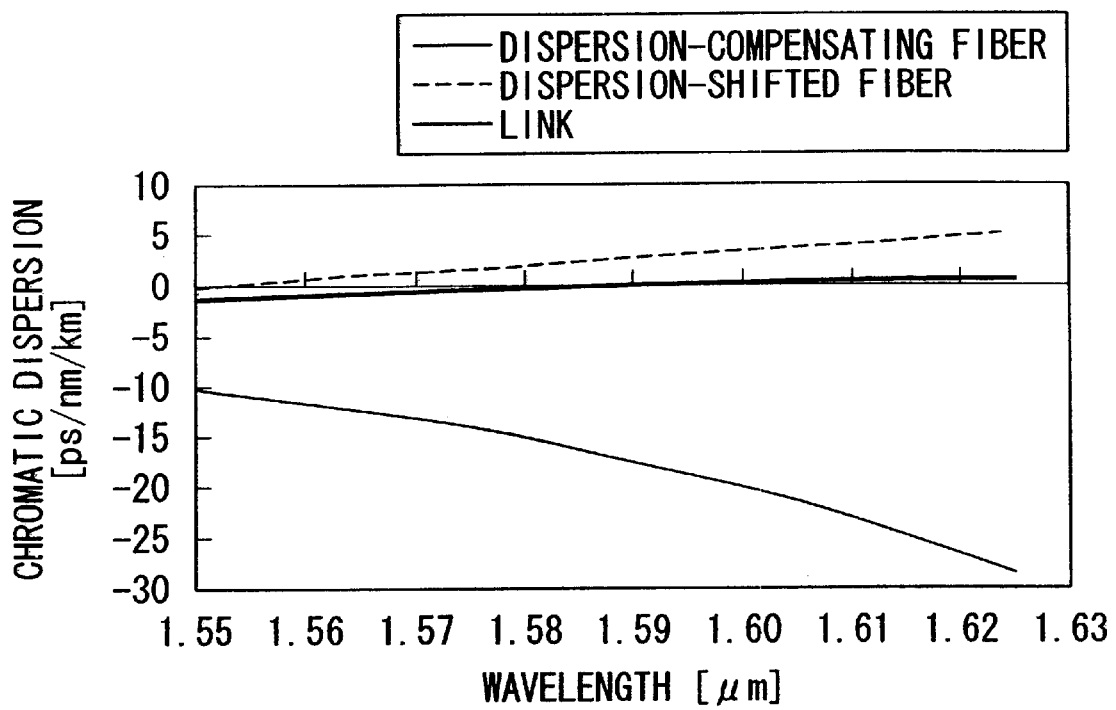
FIG. 2A is a graph showing the relationship between wavelength and chromatic dispersion in a dispersion-compensating fiber according to an experimental example of the present invention, a DSF, and in a hybrid optical fiber link.
Figure 2B:
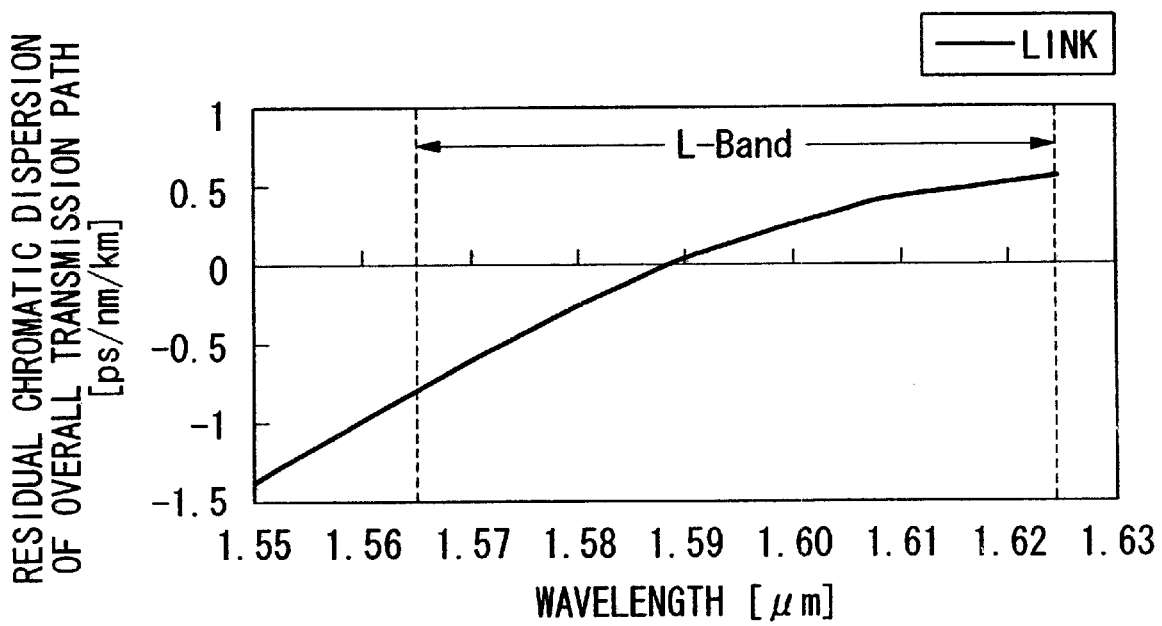
FIG. 2B is an enlarged graph showing the relationship between wavelength and residual chromatic dispersion in a hybrid optical fiber link according to the experimental example of the present invention.

FIG. 2A is a graph showing the relationship between chromatic dispersion and wavelength in the case of the dispersion-compensating fiber and the DSF, and the case of the hybrid optical fiber link (abbreviated as link in FIG. 2A). FIG. 2B is an enlarged graph showing the relationship between residual chromatic dispersion and wavelength in the case of the hybrid optical fiber link.

As shown in FIG. 2B, the residual chromatic dispersion of the overall hybrid optical fiber link is −92 to +92 ps/nm in the L-band, and the residual chromatic dispersion per km is −0.6 to +0.6 ps/nm/km. This value is sufficient for WDM transmission at, for instance, 10 Gb/s in the L-band Thus, the experimental examples of the present invention clearly demonstrate that, in the L-band, the chromatic dispersion of the DSF can be sufficiently compensating to enable to the DSF to be used in WDM transmission.

What is claimed is:

1. A dispersion-compensating fiber comprising:
   a central core segment;
   an intermediate core segment which is provided around the central core segment;
   a ring core segment which is provided around the intermediate core segment; and
   a clad which is provided around the ring core segment, wherein the refractive index profile of the dispersion-compensating fiber being such that the intermediate core segment has a lower refractive index than the central core segment, the ring core segment has a refractive index which is higher than that of the intermediate core segment and lower than that of the central core segment, and the clad has a refractive index which is lower than or equal to that of the ring core segment and higher than that of the intermediate core segment; and when the dispersion-compensating fiber is linked with a dispersion-shifted fiber which satisfies the following conditions:
(A) single-mode transmission is actually achieved at a wavelength of 1.565 µm;
(B) the zero dispersion wavelength is within the range of 1.55 µm±0.05 µm;
(C) at all wavelengths of between 1.525 µm and 1.575 µm, chromatic dispersion is greater than or equal to −3.5 ps/nm/km and less than or equal to +3.5 ps/nm/km;
(D) the dispersion slope at the zero dispersion wavelength is greater than or equal to +0.05 ps/nm$^2$/km and less than or equal to +0.085 ps/nm$^2$/km,
the residual chromatic dispersion is below +1.5 ps/nm/km in all or part of the band of wavelengths from 1.565 µm to 1.625 µm.

2. The dispersion-compensating fiber according to claim 1, wherein the residual chromatic dispersion when linked with the dispersion-shifted fiber is below ±0.8 ps/nm/km.

3. The dispersion-compensating fiber according to claim 1, wherein, at a wavelength of 1.60 µm, chromatic dispersion is less than or equal to −8 ps/nm/km, a dispersion slope is less than or equal to −0.12 ps/nm /km, an effective area is more than or equal to 10 µm$^2$, and a bending loss is less than or equal to 70 dB/m.

4. The dispersion-compensating fiber according to claim 1, wherein, at a wavelength of 1.60 µm, chromatic dispersion is less than or equal to −18 ps/nm/km, a dispersion slope is less than or equal to −0.30 ps/nm$^2$/km, an effective area is more than or equal to 12 µm$^2$, and a bending loss is less than or equal to 40 dB/m.

5. The dispersion-compensating fiber according to claim 1, wherein the relative refractive index difference of the central core segment with respect to the clad is greater than or equal to 0.8% and less than or equal to 2.4%; the relative refractive index difference of the intermediate core segment with respect to the clad is greater than relative −2.0% and less than or equal to −0.5%, the relative refractive index difference of the ring core segment with respect to the clad is greater than 0% and less than or equal to 0.7%; and the radius of the ring core segment is greater than or equal to 5 µm and less than or equal to 17 µm.

6. The dispersion-compensating fiber according to claim 5, wherein the relative refractive index difference of the ring core segment with respect to the clad is greater than 0.05% or equal to and less than or equal to 0.7%.

7. The dispersion-compensating fiber according to claim 1, wherein the ratio of the radius of the intermediate core segment to the radius of the central core segment is between 1.5 and 3.5.

8. A dispersion-compensating module using the dispersion-compensating fiber according to claim 1.

9. A hybrid optical fiber link comprising:
the dispersion-compensating fiber according to claim 1; and
a dispersion-shifted fiber which is linked with the dispersion-compensating fiber and which satisfies the following conditions:
(E) single-mode transmission is actually achieved at a wavelength of 1.565 µm;
(F) the zero dispersion wavelength is within the range of 1.55 µm±0.05 µm;
(G) at all wavelengths of between 1.525 µm and 1.575 µm, chromatic dispersion is greater than or equal to −3.5 ps/nm/km and less than or equal to +3.5 ps/nm/km;
(H) the dispersion slope at the zero dispersion wavelength is greater than or equal to +0.05 ps/nm$^2$/km and less than or equal to 0.085 ps/nm$^2$/km.

10. The hybrid optical fiber link according to claim 9, wherein the length of the dispersion-compensating fiber is less than or equal to one-half the length of the dispersion-shifted fiber.

11. The hybrid optical fiber link according to claim 10, wherein the length of the dispersion-compensating fiber is between one-third and one-twentieth the length of the dispersion-shifted fiber.

* * * * *